(12) United States Patent
Wigren et al.

(10) Patent No.: US 9,220,071 B2
(45) Date of Patent: Dec. 22, 2015

(54) SLOW CONGESTION CONTROL

(75) Inventors: Torbjörn Wigren, Uppsala (SE); Klas Johansson, Sundbyberg (SE); Anders Lamm, Molndal (SE); Magnus Persson, Sollentuna (SE); Liina Savolainen, Göteborg (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 40 days.

(21) Appl. No.: 14/353,348

(22) PCT Filed: Mar. 12, 2012

(86) PCT No.: PCT/SE2012/050270
§ 371 (c)(1),
(2), (4) Date: Apr. 22, 2014

(87) PCT Pub. No.: WO2013/066234
PCT Pub. Date: May 10, 2013

(65) Prior Publication Data
US 2014/0256337 A1 Sep. 11, 2014

Related U.S. Application Data

(60) Provisional application No. 61/555,669, filed on Nov. 4, 2011.

(51) Int. Cl.
*H04W 52/24* (2009.01)
*H04W 52/34* (2009.01)
*H04W 28/02* (2009.01)
*H04W 52/14* (2009.01)

(52) U.S. Cl.
CPC .......... *H04W 52/24* (2013.01); *H04W 28/0236* (2013.01); *H04W 28/0284* (2013.01);
(Continued)

(58) Field of Classification Search
CPC ............ H04W 52/24; H04W 28/0289; H04W 28/0284; H04W 28/036; H04W 52/241; H04W 52/343; H04W 52/146
See application file for complete search history.

(56) References Cited

U.S. PATENT DOCUMENTS

2008/0279121 A1  11/2008  Englund et al.
2009/0190485 A1*  7/2009  Bjorkegren et al. .......... 370/252
(Continued)

FOREIGN PATENT DOCUMENTS

WO  WO 2009/096830  8/2009
WO  WO 2011/004354  1/2011
WO  WO 2011/081581  7/2011

OTHER PUBLICATIONS

European Search Report for Application No./Patent No. 12845579.7-1855 / 2774425, Feb. 10, 2015.
(Continued)

*Primary Examiner* — Chuong A Ngo
(74) *Attorney, Agent, or Firm* — Patent Portfolio Builders, PLLC

(57) ABSTRACT

A method for power control stabilization in the uplink of a cellular CDMA communication system applying a fast inner loop power control comprises determining (210) of a radio frame based RoT value for a cell. A radio frame based SINR is determined (212) for individual UEs in the cell. The RoT value is compared (214) with a first threshold. Each frame based SINRs is compared (218) with a second threshold. The fast inner loop power control for a UE is broken (220) in dependence of the comparisons. The breaking comprises commanding (222) of a first number of consecutive power down commands to UEs having the frame based SINR above the second threshold for a RoT value above the first threshold and toggling (224) of power control commands for the subset of UEs during a second number of radio frames for a RoT value above the first threshold.

19 Claims, 10 Drawing Sheets

(52) U.S. Cl.
CPC ........ H04W28/0289 (2013.01); H04W 52/241 (2013.01); H04W 52/343 (2013.01); H04W 52/146 (2013.01)

(56) References Cited

U.S. PATENT DOCUMENTS

2009/0190561 A1    7/2009  Yokoyama
2011/0009150 A1*   1/2011  Cairns ........................... 455/522

OTHER PUBLICATIONS

International Search Report for International Application No. PCT/SE2012/050270, Feb. 26, 2013.

"Fundamental Limitations of Power Control in WCDMA" by Fredrik Gunnusson, IEEE Member; Division of Control and Communications; Department of Electrical Engineering, 2001.

Written Opinion of the International Searching Authority for International Application No. PCT/SE2012/050270, Feb. 26, 2013.

"Estimation or uplink WCDMA load in a single RBS" by Torbjörn Wigren of Ericsson AB and Per Hellqvist of True Value Solutions AB, 2007

"Soft Uplink Load Estimation in WCDMA" by Torbjörn Wigren, Senior Member, IEEE; IEEE Transactions on Vehicular Technology, vol. 58, No. 2, Feb. 2009.

* cited by examiner

SLOW CONGESTION CONTROL

PRIORITY

This nonprovisional application is a U.S. National Stage Filing under 35 U.S.C. §371 of International Patent Application Serial No. PCT/SE2012/050270, filed Mar. 12, 2012 and entitled "Slow Congestion Control," which claims the benefit of U.S. Provisional Application No. 61/555,669, filed Nov. 4, 2011 and entitled "Slow Congestion Control."

TECHNICAL FIELD

The present invention relates in general to cellular communication systems and in particular to power control procedures in cellular communication systems.

BACKGROUND

The User Equipments (UEs) of the Wideband Code Division Multiple Access (WCDMA) uplink (UL) are subject to fast inner loop power control. The power control loops steer the powers of the UEs, so as to achieve the Signal-to-Interference-and-Noise Ratio (SINR) targets set for the connection of the UEs. This in turn means that all power control loops are coupled nonlinearly, via the SINR measurement. It is well established in the literature that the loops stay stable as long as the UL is operating below the pole capacity of the cell. However, when the system is close to the pole capacity stability is reduced and so called power rushes can occur because one or several of the users can not reach their SINR targets. This is a very significant problem in WCDMA since the power control loops are very fast and capable of stepping up the UE power with 1500 dBs/second. Means to prevent such power rushes are therefore a necessity in case the UL of the WCDMA system is to be operated close to the pole capacity.

In near future versions of WCDMA, Interference Suppression (IS) and time division scheduling (TD) will be used in order to achieve better performance in terms of e.g. peak data rates, coverage, system throughput and system capacity. However, the power rush problems described above become even more pronounced with TD and with IS. TD schedules High Data Rate (HDR) users per Hybrid Automatic Repeat-reQuest (HARQ) per 2 ms Transmission Time Interval (TTI), which corresponds to 3 time slots (with 1500 slots/second, or 0.667 ms per slot). This may give rise to very sudden and relatively large changes in the load. IS often allows and requires more aggressive scheduling in order to reach the full performance potential. Since IS gains sometimes disappear because of inter-antenna branch correlation, aggressive scheduling can make the WCDMA uplink more prone to power rushes. The SINR measures will increase considerably by a disappearance of the IS gain, initiating an intense power control activity.

Fast congestion control (FCC) is a set of methods to prevent power runaway in the UL. FCC may use various measurements to achieve its goal, however a high BandWidth (BW) measurement of, or associated with, the WCDMA UL load is a necessary ingredient. Here, high BW means that the measurement is made as fast as the sampling of the fast power control loop, i.e. in WCDMA at a rate of 0.667 ms. The delay of this measurement, as compared to the power control loops must not be more than 1-2 times 0.667 ms.

One problem is thus that such fast measurements with low delay are not available in systems with old HardWare (HW). Such HW does not generally support TD or IS and has typically a limited memory capacity. Hence, there is no option to easily introduce high BW or low delay measurements. Within existing solutions, there is no known way to perform FCC in WCDMA systems when the available RoT measurement has a significantly lower bandwidth than the fast inner loop power control loops of the WCDMA UL. Any low cost congestion control solution therefore needs to rely on existing measurements. Also, in near future systems with new HW, TD and/or IS will probably be introduced before fast congestion control is introduced. Any congestion control introduced before FCC therefore needs to rely on existing measurements.

A more specific problem that has been found to arise without a well operating FCC and that have no prior art solution is a high risk that the powers of the UEs may increase significantly. In worst case a power increase of 15-20 dB can take place before any action at all can be taken. By breaking the power control loop, such a rush can indeed be avoided. However, this action has further consequences in that there is a high risk that UEs may re-initiate a power rush, unless power control loops are kept broken until the next available RoT measurement appears. Furthermore, there is a high risk that e.g. fading effects may reduce the SINR of the users to unacceptably low levels. Such low levels may possibly cause dropped calls in case power control loops are long. This can be the case, e.g. if power control loops are kept broken until a next RoT measurement arrives.

The overall consequences for the prior art situation include that systems with old HW will not be able to use a more aggressive scheduling. Thereby, little performance improvement will be possible even when other improvements support more aggressive scheduling. Furthermore, systems with new HW and TD and/or IS will not be able to utilize the full performance benefit associated with these features, that is associated with aggressive scheduling.

SUMMARY

A general object with the present invention is to stabilize the uplink in a CDMA cellular communication system. The general object is achieved by methods for power control and Node Bs according to the enclosed independent patent claims. Preferred embodiments are defined by dependent claims.

In general words, in a first aspect, a method for power control stabilization in the uplink of a cellular CDMA communication system applying a fast inner loop power control comprises determining of a radio frame based RoT value for a cell in the cellular communication system. A radio frame based SINR is determined for each UE in a subset of UEs being present in the cell. The RoT value is compared with a first threshold. The frame based SINRs are compared with a second threshold for each of the UEs in the subset. The fast inner loop power control for a UE is broken in dependence of a result of the comparing of the RoT value with a first threshold and a result of the comparing of the frame based SINRs with a second threshold. The breaking of the fast inner loop power control in turn comprises commanding of a first number of consecutive power down commands to UEs having the frame based SINR above the second threshold as response to a RoT value above the first threshold and toggling of power control commands for the subset of UEs during a second number of radio frames as response to a RoT value above the first threshold.

In a second aspect, a Node B in a CDMA cellular communication system comprises a fast inner loop power control unit, a load measure unit, an interference determining unit and a slow congestion control unit. The load measure unit is configured for determining a radio frame based RoT value for a cell of the Node B in the cellular communication system. The interference determining unit is configured for determining a radio frame based SINR for each UE in a subset of UEs being present in the cell. The slow congestion control unit is connected to the fast inner loop power control unit, the load measure unit and the interference determining unit. The slow congestion control unit in turn comprises a first comparator and a second comparator. The first comparator is configured for comparing the RoT value with a first threshold. The second comparator is configured for comparing the frame based SINRs with a second threshold for each of the UEs in the subset. The slow congestion control unit is configured for controlling the fast inner loop power control unit in dependence of a result of the comparing of the RoT value with a first threshold and a result of the comparing of the frame based SINRs with a second threshold. The controlling of the fast inner loop power control unit comprises controlling of the fast inner loop power control unit to command a first number of consecutive power down commands to UEs having the frame based SINR above the second threshold as response to a RoT value above the first threshold and controlling of the fast inner loop power control unit to toggle power control commands for the subset of UEs during a second number of radio frames as response to a RoT value above the first threshold.

One advantages of the invention and the final technical effect is a significantly more stable TD function for EUL. Furthermore, a potentially higher throughput of the G-rake+ IS receiver is provided, since the invention allows for more aggressive scheduling. Also, a potentially higher throughput of the EUL on older HW, lacking IS and TD, is provided achieved by a more aggressive scheduling which is made feasible by the invention. Further advantages are discussed in connection with the embodiments of the detailed description

BRIEF DESCRIPTION OF THE DRAWINGS

The invention, together with further objects and advantages thereof, may best be understood by making reference to the following description taken together with the accompanying drawings, in which.

DETAILED DESCRIPTION

Throughout the drawings, the same reference numbers are used for similar or corresponding elements.

In the present description, the terms Node B and RBS are used as synonyms.

In the present invention, measures of RoT and SINR are utilized. These measures can in general be performed according to different methods available in prior art. Some notable aspects of these methods are summarized here below.

When considering uplink load measures, it is e.g. shown in prior art that with a rudimentary Code Division Multiple Access (CDMA) receiver, such as the RAKE receiver, the load at the antenna connector is given by the noise rise, or Rise over Thermal, RoT(t), defined by:

$$RoT(t) = \frac{RTWP(t)}{N(t)}, \tag{1}$$

where N(t) is the thermal noise level as measured at the antenna connector. The relative measure RTWP(t) is unaffected of any de-spreading applied and is here the total wideband power:

$$RTWP(t) = \sum_{k=1}^{K} P_k(t) + I^N(t) + N(t), \tag{2}$$

also measured at the antenna connector. Here $I^N(t)$ denotes the power as received from neighbor cells $^N$ of the WCDMA system. $P_k(t)$ denotes the power of the k:th user and N(t) denotes the thermal noise floor.

The signal reference points are, by definition at the antenna connectors. The measurements are however obtained after the analogue signal conditioning chain, in the digital receiver. The analogue signal conditioning chain does introduce a scale factor error which fortunately cancels as:

$$RoT^{Digital\ Receiver}(t) = \frac{RTWP^{Digital\ Receiver}(t)}{N^{Digital\ Receiver}(t)} \tag{3}$$

$$= \frac{\gamma(t)RTWP^{Antenna}}{\gamma(t)N^{Antenna}(t)}$$

$$= RoT^{Antenna}(t).$$

Note that:

$$I^N(t)+N(t)=E[I^N(t)]+E[N(t)]+\Delta I^N(t)+\Delta N(t), \tag{4}$$

where E[ ] denotes statistical expectation and where Δ denotes the variation around the mean. Since there are no measurements available in the (Radio Base Station) RBS that are related to the neighbor cell interference, a linear filtering operation can at best estimate the sum $E[I^N(t)]+E[N(t)]$, cf. [1], and cannot be used to deduce the value of E[N(t)].

Figure 1:
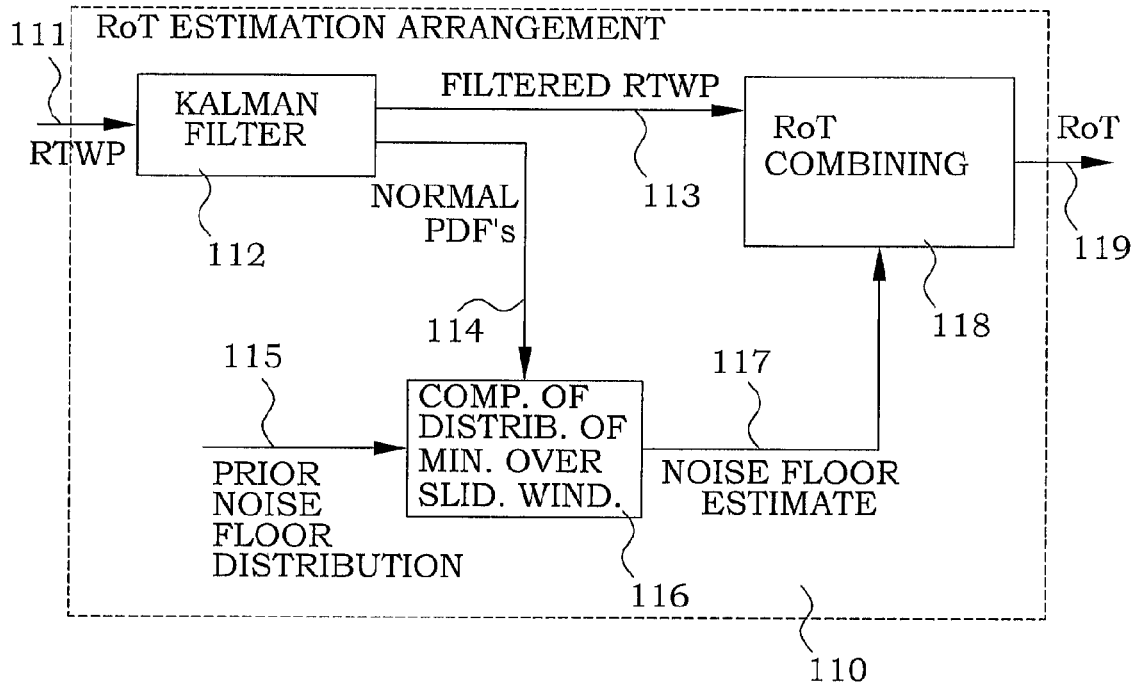
FIG. 1 is a schematic illustration of an example of a RoT estimation arrangement.

A first RoT estimation algorithm, a sliding window algorithm, (currently in use) is depicted in FIG. 1. It is described in detail in [1], which hereby is incorporated by reference in its entirety. The algorithm estimates the RoT, as given by (1). An accurate estimation of the thermal noise floor N(t) is computed by consideration of the soft minimum as computed over a relative long window in time. In summary, measurements $x^{RTWP}(t)$ 111 of RTWP are inputted into a Kalman filter 112 of a RoT estimation arrangement 110. A filtered RTWP $x^{RTWP}(t|t)$ 113 is provided to a RoT combining section 118. Normal pdf's $f^{RTWP}(x,t)$ 114 are provided to a noise floor estimator 116. By use of a prior noise floor distribution $f_0^{RTWP}(x)$ 115, the noise floor estimator 116 provides a noise floor estimate $\hat{x}^{thermal}(t)$ 117 to the RoT combining section 118. The RoT combining section 118 combines the filtered RTWP $x^{RTWP}(t|t)$ 113 and the noise floor estimate $\hat{x}^{thermal}(t)$ 117 to a RoT estimate $\hat{L}_{NR}(t)$ 119.

The sliding window algorithm of the above section has the disadvantage of requiring a large amount of storage memory. This becomes particularly troublesome in case a large number of instances of the algorithm is needed, as may be the case when IS is introduced in the uplink. To reduce the memory consumption a recursive algorithm has been disclosed, see e.g. [4]. That algorithm reduces the memory requirements of the sliding window scheme discussed above at least by a factor of 100. The present invention is applicable both to the sliding window RoT estimation algorithm and the recursive algorithm. Furthermore, even if these two algorithms are the presently preferred algorithms, other algorithms for estimation of RoT are also possible to use for providing RoT measures for the present invention.

The SINR before any receiver processing is obtained by measurement of the power and spread of the Dedicated Physical Control CHannel (DPCCH) channel (the pilot). Briefly, in this case the SINR is given by:

$$SINR = \frac{\left|\frac{1}{N_{pilotsymbols}}\sum_{pilotsymbols} S_{pilotsymbol}\right|^2}{\text{Var}}. \qquad (4)$$

$$\text{Var} = \frac{1}{N_{pilotsymbols}}\left|S_{pilotsymbol} - \frac{1}{N_{pilotsymbols}}\sum_{pilotsymbols} S_{pilotsymbol}\right|^2. \qquad (5)$$

In practice various refinements to the above formulas is made, however this is the basic setup. Above, $N_{Symbols}$ is the number of symbols used for estimation, whereas $S_{Symbol}$ denotes the symbol itself. The measurement above is hence performed on de-spread symbols. When IS receivers like the G-rake+ is used different SINR measurement principles apply.

The power control loop of CDMA systems is the origin of the power rush problems. In order to understand the basic conditions around such power control, the WCDMA fast inner loop power control is briefly described here below.

Figure 2:
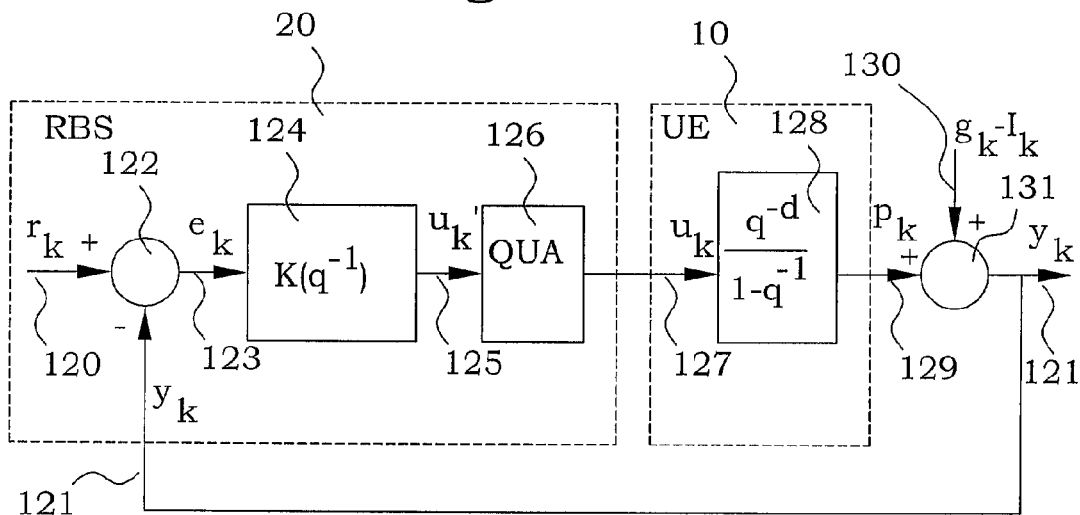
FIG. 2 is a schematic illustration of an example of a fast inner loop control arrangement.

A simplified block diagram of the inner power control loop of one UE in the WCDMA uplink appears in FIG. 2. Note that the quantities are expressed in a logarithmic scale ([dB]). Here, $r_k$ the target Signal-to-Interference Ratio (SIR) and k discrete time ([slot, 667 micro seconds]). The target SIR 120 and the measured SIR $y_k$ 121 are input to a subtractor 122 in an RBS 20, finding the SIR error $e_k$ 123. A controller 124 denoted by $K(q^{-1})$, where $q^{-1}$ denotes the backward shift operator, gives a control signal $u_k$ 125. In the illustrated implementation, the controller represents a constant. A quantizer 126 quantizes the control signal $u_k$ 125 into the one-bit quantized transmitted control signal $u_k$ 127. The bit quantized transmitted control signal $u_k$ 127 is received in a UE 10 and transmit power controller 128 gives a transmit power $p_k$ 129, here according to $q^{-d}/(1-q^{-1})$, where d is the delay in slots. After addition 131 of the uplink channel gain $g_k$ minus the interference $I_k$, 130, the measured SIR $y_k$ 121 is obtained. The fast inner loop power controller operates at a frequency of 1500 Hz.

Different IS techniques are used within prior art to improve the performance. Some basic aspects of a few examples of IS receivers are described here below.

The difference with GRAKE+ IS receiver as compared to conventional RAKE receiver, is that each user sees a reduced level of interference, immediately after the weight combining step. In GRAKE+, a covariance matrix $\hat{R}_u$, u=1, ..., U, with the order equal to the number of fingers is first estimated to capture the interference. The codes not used by the present user u may be used in order to estimate $\hat{R}_u$.

The GRAKE+ receiver uses the estimated covariance matrix that models the interference for computation of the combining weights for the users u, u=1, ..., U.

$$\hat{R}_u \hat{w}_u = \hat{h}_u, u=1, \ldots, U \qquad (6)$$

where $\hat{h}_u$, u=1, ..., U, is the net channel response of user u and where $\hat{w}_u$ are the combining weights.

The effect of (6) is that GRAKE+ essentially whitens the correlated interference and removes large spectral peaks from interferers at certain finger locations and for certain antenna elements.

Note that GRAKE+ is still a linear receiver. There is a related type of IC receiver for WCDMA which is also linear, denoted the chip equalizer. The difference between GRAKE+ and the chip equalizer is simply the order of certain basic operations. Principles valid for GRAKE+ are consequently in most cases applicable to the chip equalizer as well.

To explain the G-rake IS receiver, it is easiest to make a comparison to the G-rake+ description, given here above. To explain the difference between the G-rake and the G-rake+ concepts, it is noted that they only differ in the way the impairment matrix $\hat{R}_u$ is computed. The G-rake is also denoted the parametric G-rake, which points to the fact that the impairment matrix is estimated via a model believed to be relevant for the case. The G-rake+ is also denoted the non-parametric G-rake. In this case the impairment matrix is estimated from measurements of an unused uplink code, i.e. a code that is not used for data transmission of any user in the cell. In this way, the energy on this code represents a mix of transmissions from neighbor cells and energy "leaking" from the transmission of the own cell. The assumption is that this energy is representative of the interference experienced by the users of the cell. Experiments indicate that this is a valid assumption. The contributions from the unused code are first de-spread and then rank 1 contributions from a number of symbols are summed up to give $\hat{R}_u$. More details in this matter can be found e.g. [3], which hereby is incorporated by reference in its entirety.

Since also TD is a technique which may influence the uplink stability, a short summary is given here.

In the 3GPP release 99, the Radio Network Controller (RNC) controls resources and user mobility. Resource control in this framework means admission control, congestion control, channel switching (roughly changing the data rate of a connection). Furthermore, a dedicated connection is carried over a Dedicated CHannel (DCH), which is realized as a DPCCH (Dedicated Physical Control Channel) and a DPDCH (Dedicated Physical Data Channel).

In the evolved 3G standards, the trend is to decentralize decision making, and in particular the control over the short term data rate of the user connection. The uplink data is then allocated to Enhanced Dedicated CHannel (E-DCH), which is realized as the triplet: a DPCCH, which is continuous, an E-DCH Dedicated Physical Control CHannel (E-DPCCH) for data control and an E-DCH Dedicated Physical Data CHannel (E-DPDCH) for data. The two latter are only transmitted when there is uplink data to send. Hence the Node B uplink scheduler determines which transport formats each user can use over E-DPDCH. The RNC is however still responsible for admission control.

Figure 3A:
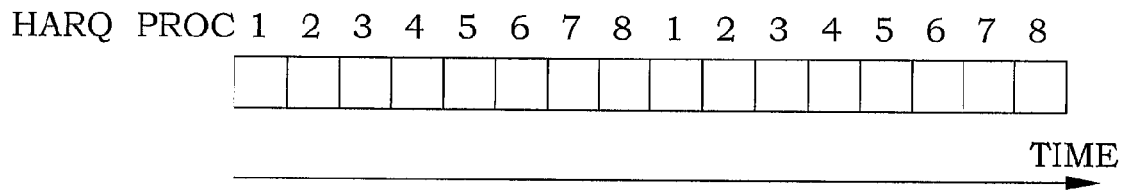
FIGS. 3A-B are schematic illustrations of examples of HARQ processing.

A data block is sent by the UE to the NodeB during a transmission time interval (TTI). For efficiency reasons, the received data blocks at the receiver are processed in parallel at M parallel processors taking turn to process data. While data block i is processed and decoding information is fed back to the transmitter, the receiver starts processing data blocks i, i+1, ... etc. By the time when the first receiver processor has decoded the data block and fed back the decoding result, it is ready for processing either a retransmission of information related to the recently processed data or a new data block. By combining information both from the original data block and the retransmission, it is possible to correct errors in the reception. A retransmission scheme with both error correction and error detection is referred to hybrid ARQ. Therefore, the M processors are often referred to as HARQ processes, each handling a data block received in a TTI. FIG. 3A depicts parallel HARQ processors for M=8.

In the WCDMA uplink, there is a trade-off between coverage and enabled peak rates. This is even more emphasized with enhanced uplink, which supports higher bit rates than ordinary dedicated channels. The uplink resources are limited by the rise over thermal (RoT) that the cell can tolerate. The RoT limit is either motivated by coverage requirements or power control stability requirements. When only one user is connected in the cell, both power control stability and coverage are minor issues, since the uplink interference is likely to be dominated by the power generated by this user. In such a case it is tempting to allow a high RoT in order to allow high received signal relative interference powers, Ec/Io, which enables the use of high uplink bit rates. Conversely, in order to use the high uplink bit rates, the user connections have to provide high Ec/Io, which implies high RoT.

Figure 3B:
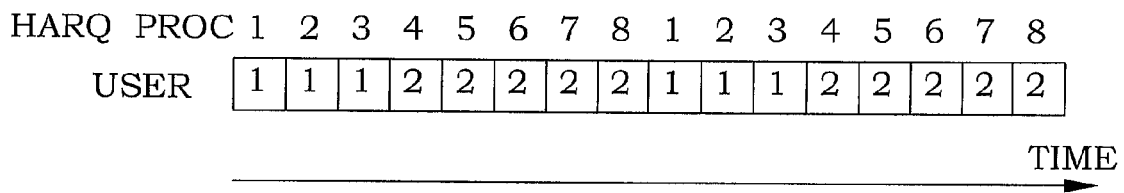

In order to orthogonalize the uplink user transmissions to a greater extent, it can be relevant to separate the user data transmissions in time, and employ a TD (time division multiplex) scheme. It is possible to allocate grants to a user that is only valid for specified HARQ processes. This fact can be exploited to enable TD for EUL. Furthermore, it allows retransmissions without interfering with other users, since retransmissions hit the same HARQ process as the original transmission. FIG. 3B provides some example resource allocations in a TD setting.

FCC known in prior art that is relevant to the present invention is based on using consecutive estimate of the load (1), estimated at least as fast as the power control bandwidth of 1500 Hz. Functions of this load, e.g. the rate of change of (1) and the absolute level of (1), are then compared to corresponding thresholds and a power rush is declared if one or more of the functions exceed their corresponding thresholds. The actions taken in response to a declared power rush is normally to break at least a subset of the power control loops, by sending a down command as long as the interference rush persists. The success of the FCC is however completely dependent on the access to fast load estimations.

In the absence of fast load estimations, FCC can not be performed. Since the present invention is based on that fast load estimations not necessarily are available, the proposed solution is a slow congestion control (SCC) approach. There is, according to the discussions above, a need to understand that solutions for congestion control indeed are possible, utilizing existing radio measurements suitable for this purpose. The measurements that are available and suitable include Rise over thermal (RoT) or received total wideband power (RTWP) together with the thermal noise power floor. The RoT is estimated typically with 10 ms sampling rate, and is derived from the received total wideband power (RTWP) measurement. The RTWP and the thermal noise power floor are also typically measured and estimated with 10 ms sampling rate.

A subset of these measurements, performed in the radio subsystem of the radio base station (RBS), can then, at least with some delay, be signaled to the baseband subsystem of the radio base station (RBS). These measurements can be compared to a coverage threshold RoT, possibly reduced with a configurable parameter. In case the RoT is above the threshold, such a fact can be used to initiate an issue of a fixed number of sequential down commands to the fast inner loop power control loop of a subset of UEs. Thereby the control loops are broken, the interference level is reduced and a potential power rush is prevented.

The UEs can continuing be held at a constant reduced power level e.g. by issuing toggling power commands to the fast inner loop power control loop of the subset of users, for a pre-specified number of radio slots or radio frames. The UEs can eventually be released to normal fast inner loop power control operation. This may e.g. be performed according to a policy, where one policy amounts to releasing all UEs simultaneously.

A consequence of the low bandwidth and delay of the RoT measurement is a need to secure that UEs are not dropped by such a control loop breakage. In order to achieve this goal the UE exploits still some further measurements, including slot based signal to interference and noise ratio (SINR) and frame based signal to interference and noise ratio (SINR). Further information that is useful includes the target SINR received from the radio network controller. These SINR measurements are used to affect fast inner loop power control or more specifically the breaking of the fast inner loop power control so that the risks of a too low SINR are made sufficiently low.

Overview aspects of one particular embodiment of the present invention provide an algorithm, architecture and configurable parameters that provide slow congestion control (SCC), based on a radio frame based RoT measurement at the radio unit. The sampling rate is typically 10 ms. This is in this particular embodiments performed by breaking fast inner loop power control loops, for at least a subset of UEs, when RoT is above a first configurable threshold. This first threshold may be set differently for 2 ms and 10 ms TTIs. This is performed by commanding a configurable number of consecutive power down commands to this subset of UEs. This action is performed only for UEs with a frame based SINR above a second configurable threshold. The second threshold is preferably different for 2 ms and 10 ms TTIs. The breaking of the fast inner loop power control loops further comprises toggling the power control commands for a configurable number of radio frames. By such a toggling is understood consecutive commands of opposite direction, e.g. up/down/up .... This toggling thereby essentially holds the power level of the subset of UEs. The toggling is preferably performed also for UEs with a frame based SINR below the second configurable threshold.

In the present embodiment, the breaking of the fast inner loop power control is stopped in case a new received RoT measurement is below the configurable first threshold. Preferably, the above steps are overridden in case the frame based SINR is below a third configurable threshold and the slot based SINR is below a forth configurable threshold. This third threshold is preferably different for 2 ms and 10 ms TTI and this fourth threshold is also preferably different for 2 ms and 10 ms TTI. The slot based SINR is evaluated every slot. The overriding is performed by simply stopping breaking the inner power control loop. The above steps are in turn overridden in case the slot based SINR is above the fourth configurable threshold, by commanding a power down step.

The RoT measurement is performed in the radio unit, whereas all other steps are performed in the base band unit.

Figure 4:
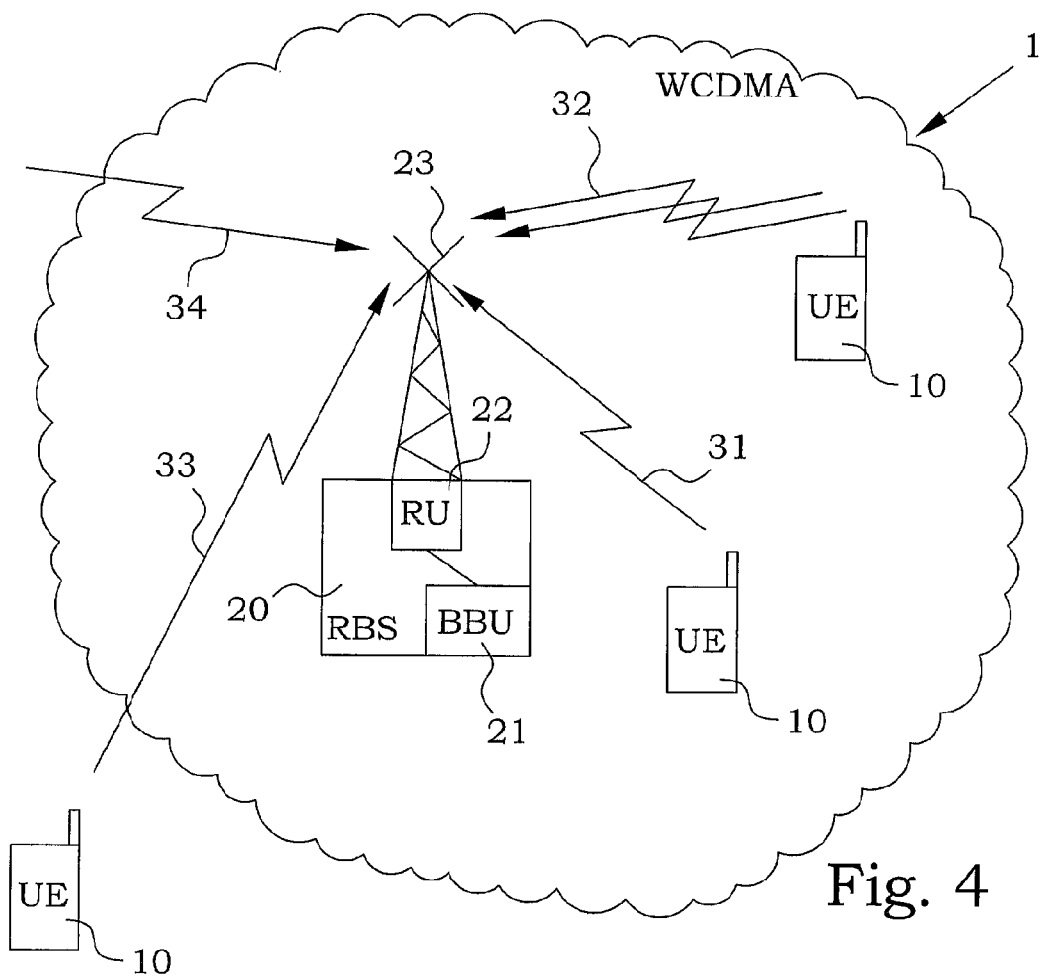
FIG. 4 is a schematic illustration of an example of a WCDMA communication system.

In FIG. 4, an embodiment of a typical WCDMA system 1 is illustrated. A number of UEs 10 communicate with an antenna 23 of a RBS 20 via UL signaling 31, 32. The RBS 20 typically comprises a Radio Unit (RU) 22 and Base Band Units (BBU) 21. As described further above, the RBS 20 is involved in the TPC function. Interfering signaling 33 from UEs of neighboring cells as well as other interfering radio signals 34 are also received by the antenna 23.

Figure 5:
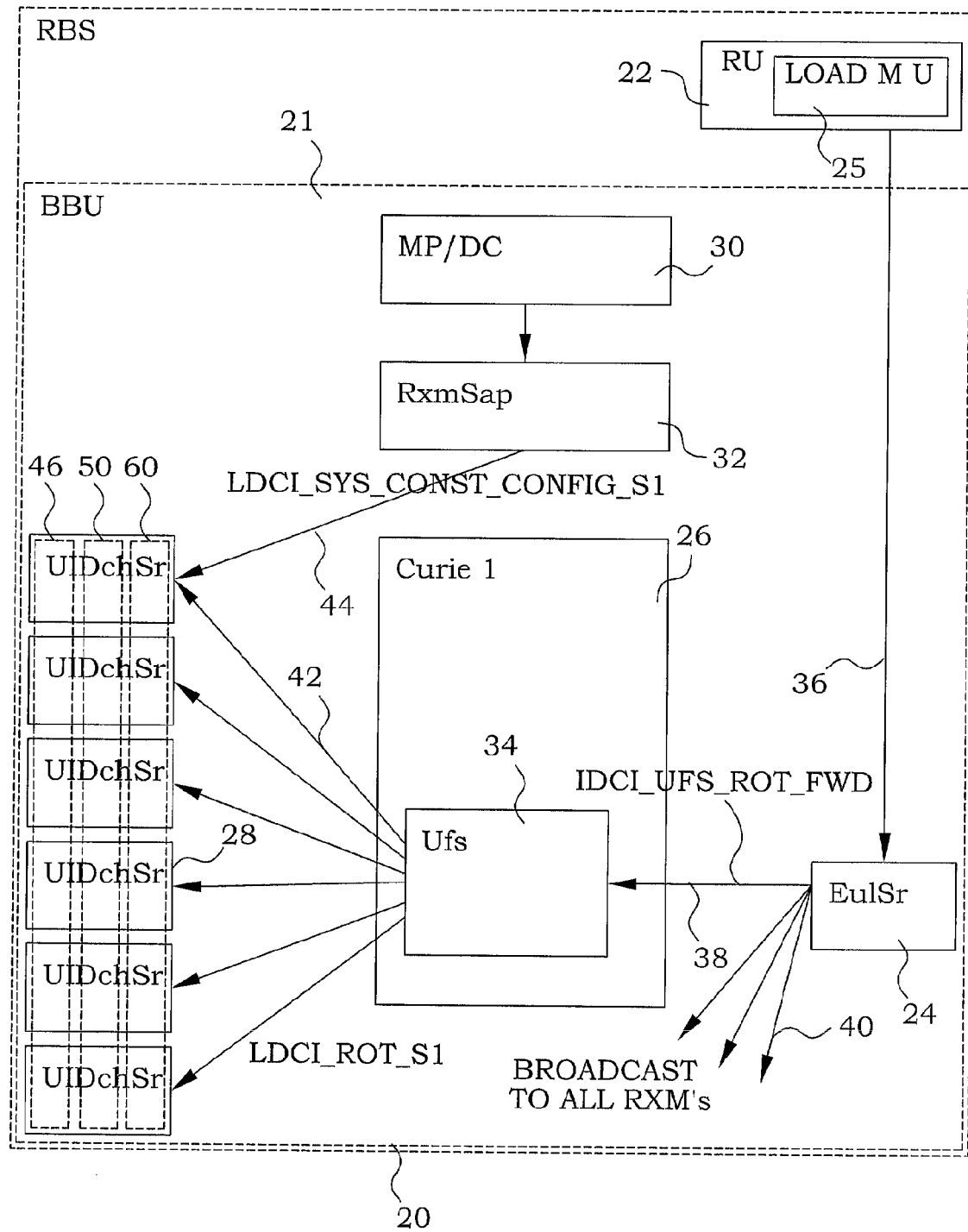
FIG. 5 is a schematic block diagram of an embodiment of a radio base station.

An example embodiment of an SCC architecture in a radio base station 20 is depicted in FIG. 5. The figure shows the signal path of the RoT measurement 36 from a load measure unit 25 in the radio unit (RU) 22, to the EUL scheduler (EulSr) 24. From there the measurement is distributed within the BBU 21, via the Curie circuit 26. In this embodiment the RoT measurements are thus forwarded from the EulSr as the data IDCI_UFS_ROT_FWD 38 to an UFOP Set (Ufs) unit 34. The RoT is sent on from the Curie circuit to the slow congestion control unit 60 which resides in pooled processor units. The processor units are parts of the UpLink Dedicated Channels—Symbol Rate (ULDchSR) blocks 28. In this embodiment a data block LDCI_ROT_S1 42 is therefore distributed to the ULDchSR blocks 28. The processor units also implement a set of fast inner loop power control units 50, and a corresponding set of interference determining units 46, where the interference determining units are responsible for SINR estimation. A Main Processor/Device Controller (MP/DC) unit 30 controls a Receiver Module Signal Access Point (RxmSap) 32 to provide suitable parameters for the SCC to the slow congestion control unit 60, in the present embodiment by transferring the data block LDCI_SYS_CONST_CONFIG_S1 44 between the RxmSap 32 and the slow congestion control unit 60.

During the signaling of the RoT measurement, the measurement will be delayed in different ways. This delay will influence the speed with which the SCC routine can be performed. The main delays of the RoT measurement are discussed here below. The averaging of the RTWP measurement over a radio frame, i.e. typically 15 slots, causes a delay. This delay occurs in the radio unit 22 and amounts to some 5 ms. The actual computation of the RoT also requires some time. This computation also occurs in the radio unit 22 and amounts to <1 ms. The transfer of the RoT measurement to the interface 36 to the Base Band Unit 21 or Base Band subsystem. This occurs in the radio unit 22 and may amount to a few ms. There is a reception delay on the Base Band unit 21 side, until the distribution takes place. This may require up to one radio frame, depending on signal alignment between the radio unit 22 and the EulSr 24. In a preferred embodiment, aligning the signaling, the EUL scheduler 24 is delayed until the present RoT is received, which may shorten the total delay by almost one radio frame. A typical value of the total delay without delay of the scheduler start is 16 ms. This is reduced to 8 ms with a delayed scheduler start.

Figure 6:
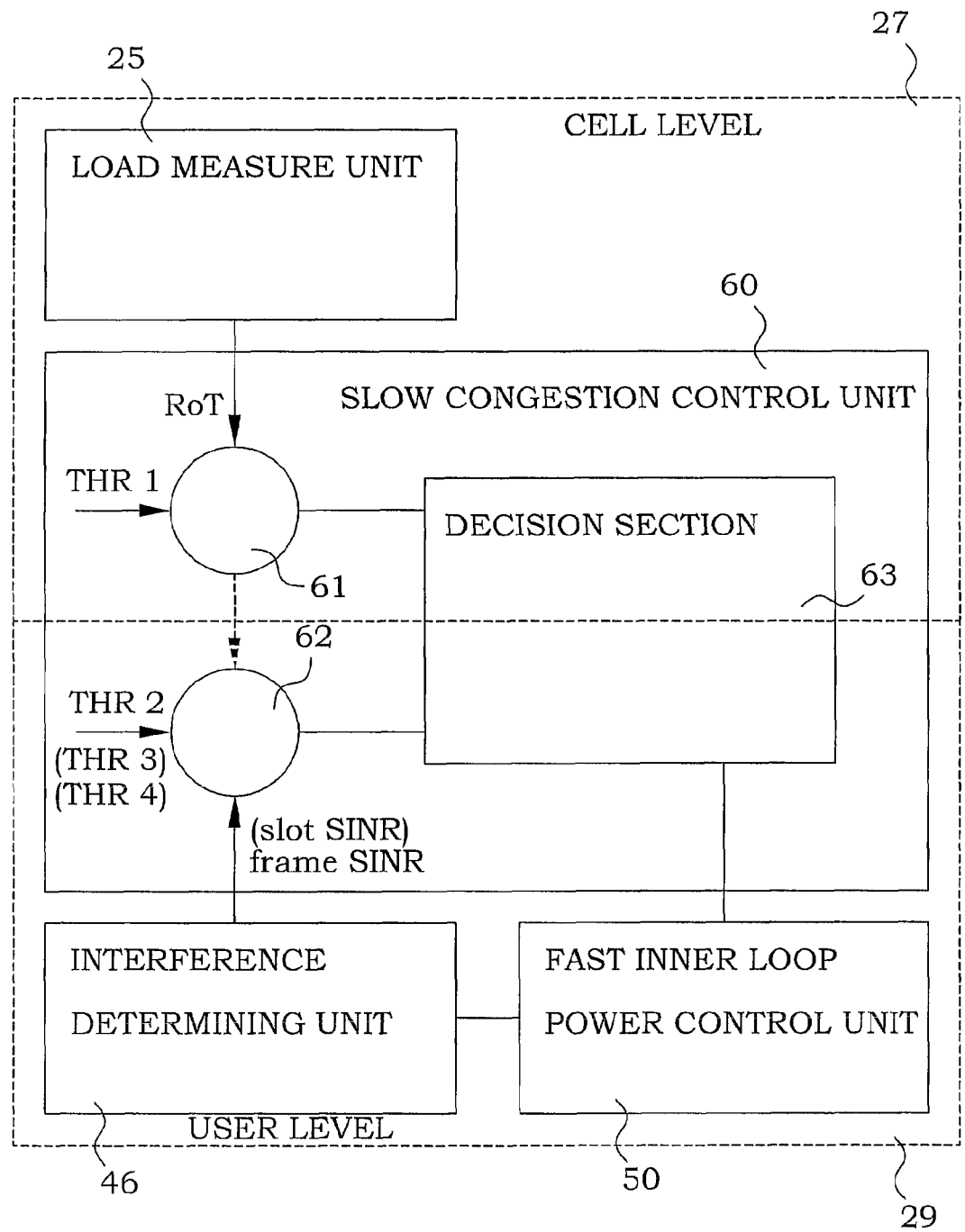
FIG. 6 is a schematic block diagram of an embodiment of a slow congestion control arrangement.

An embodiment of parts of a Node B 20 in a CDMA cellular communication system implementing the basic parts of the above presented ideas is illustrated in FIG. 6 and comprises a fast inner loop power control unit 50, a load measure unit 25, an interference determining unit 46 and a slow congestion control unit 60. The load measure unit 25 is configured for determining a radio frame based RoT value for a cell of the Node B 20 in the cellular communication system. The interference determining unit 46 is configured for determining a radio frame based SINR for each UE in a subset of UEs being present in the cell. The slow congestion control unit 60 is connected to the fast inner loop power control unit 50, the load measure unit 25 and the interference determining unit 46. The slow congestion control unit 60 in turn comprises a first comparator 61, configured for comparing the RoT value with a first threshold THR1. The slow congestion control unit 60 also comprises a second comparator 62, comparing the frame based SINRs with a second threshold THR2 for each of the UEs in the subset. The slow congestion control unit 60 has in the present embodiment a decision section 63 that is configured for controlling the fast inner loop power control unit 50 in dependence of a result of the comparing of the RoT value with a first threshold and a result of the comparing of the frame based SINRs with a second threshold. The controlling of the fast inner loop power control unit 50 comprises controlling of the fast inner loop power control unit 50 to command a first number of consecutive power down commands to UEs having the frame based SINR above the second threshold as response to a RoT value above the first threshold. The controlling of the fast inner loop power control unit 50 also comprises controlling of the fast inner loop power control unit 50 to toggle power control commands for the subset of UEs during a second number of radio frames as response to a RoT value above the first threshold.

In the present embodiment, since the comparison between the frame based SINR and the second threshold is performed for each UE, the second comparator 62 and at least a part of the decision section 63 is preferably provided at a user level 29, e.g. in base band, while the first comparator 61 preferably is provided at a cell level 27, e.g. in the base band.

It is implicitly understood from the nature of the control idea that the first and second numbers are equal to or larger than 2.

In a preferred embodiment, the slow congestion control unit 60 is configured to perform the comparing of a frame based SINR as response to a RoT value above the first threshold, as indicated by the broken arrow in FIG. 6. In a preferred embodiment the slow congestion control unit 60 is further configured for stopping the controlling of the fast inner loop power control unit 50 as a response to a new RoT value below the first threshold.

In a preferred embodiment, a slot based SINR algorithm is additionally utilized. In such an embodiment, the interference determining unit 46 is further configured for determining a slot based SINR for UEs in the subset of UEs. The slow congestion control unit 63 is further configured for comparing the frame based SINR with a third threshold THR3 for each UE in the subset. The third threshold is lower than the second threshold. The slow congestion control unit 60 is further configured for comparing the slot based SINR with a fourth threshold THR4 for each UE in the subset. The slow congestion control unit 60 is further configured for adapting the controlling of the fast inner loop power control unit 50 in dependence of a result of the comparing of the frame based SINR with a third threshold and a result of the comparing of the slot based SINR with a fourth threshold. In a preferred embodiment, the adaptation in turn comprises releasing of the fast inner loop power control unit 50 concerning a UE as a response to a coexistence of a frame based SINR lower than the third threshold and a slot based SINR lower than the fourth threshold. In a preferred embodiment, the adaptation in turn comprises controlling of the fast inner loop power control unit 50 to command a power down step to a UE as a response to a slot based SINR higher than the fourth threshold.

In a preferred embodiment, the load measure unit is comprised in a radio unit of the node B and the fast inner loop power control unit, the interference determining unit and the slow congestion control unit are comprised in a base band unit of the node B.

Figure 7:
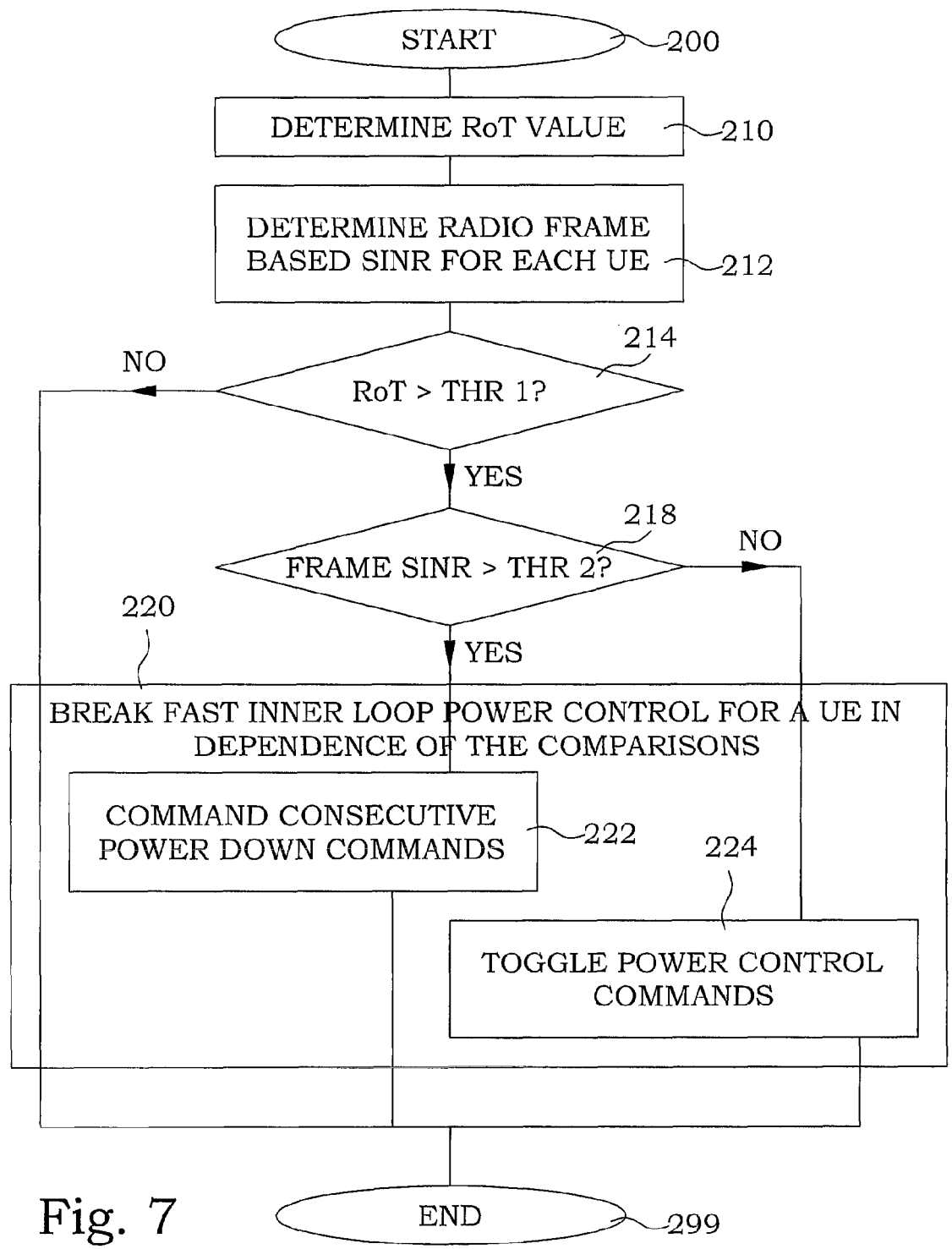
FIG. 7 is a flow diagram of steps of an embodiment of a method for power control stabilization.

A general embodiment of a method for power control stabilization is illustrated in FIG. 7. The method for power control stabilization in the uplink of a cellular CDMA communication system starts in step 200. The cellular CDMA communication system applies a fast inner loop power control. In step 210, a radio frame based RoT value for the uplink of a cell in the cellular communication system is determined. A radio frame based SINR is in step 212 determined for each UE in a subset of UEs that are present in the cell. In step 214, the RoT value is compared with a first threshold. In step 218, the frame based SINRs are compared with a second threshold for each of the UEs in the subset. The fast inner loop power control for a UE is broken in step 220 in dependence of the comparisons, i.e. a result of the comparing of the RoT value with a first threshold and a result of the comparing of the frame based SINRs with a second threshold. The step of breaking 220 of the fast inner loop power control in turn comprises the step 222 of commanding of a first number of consecutive power down commands to UEs having the frame based SINR above the second threshold as response to a RoT value above the first threshold. The step of breaking 220 of the fast inner loop power control also comprises the step 224 of toggling of power control commands for the subset of UEs during a second number of radio frames as response to a RoT value above the first threshold. The procedure ends in step 299.

A preferred embodiment of a SCC algorithm consists of two main parts, one part executed at the radio frame rate of 10 ms, following the RoT measurement, and one part that is executed at slot rate.

The algorithm of this particular embodiment is defined by the pseudo code of sections here below, as well as by the corresponding flow charts of FIG. 8 and FIG. 9.

First, the radio frame rate algorithm is described. Below, Y is a counter initially set to 0. When activated it is used to define the toggling length while RoT is above a threshold. A possible pseudo code of the SCC algorithm of the present embodiment is:

---

IF new IDCI_UFS_ROT_FWD received // new RoT value //
   IF ROT > eulMaxRot + SccRotThreshold (−3 dB)
      IF counter Y has expired (Y=0)
         Start counter, initiate to Y = sccToggleLength(2) − 1
         FOR EACH E-DCH S-RLS (with a RL in this cell)
            IF Frame SINR > sccMinFrameSinr2ms/10ms (3 dB)
               sccNumTpcDown(3) slots down, overrides TPC slow
               followed by TPC toggling
            ELSE // Frame SIR <= SccMinFrameSinr2ms/10ms (3 dB) //
               TPC toggling
            ENDIF
         END FOR
      ELSE  // Y counter not expired //
         Decrease counter Y (Y=Y−1)
      ENDIF
   ELSE  // ROT <= eulMaxRot + SccRotThreshold (−3 dB) //
      Break all SCC handling for all E-DCH
      reset counter Y (Y=0)
   ENDIF
ENDIF

---

Note that the above presented pseudo code only is a typical illustration of an implementation of the basic ideas. Many other detailed implementations are possible as well.

Figure 8:
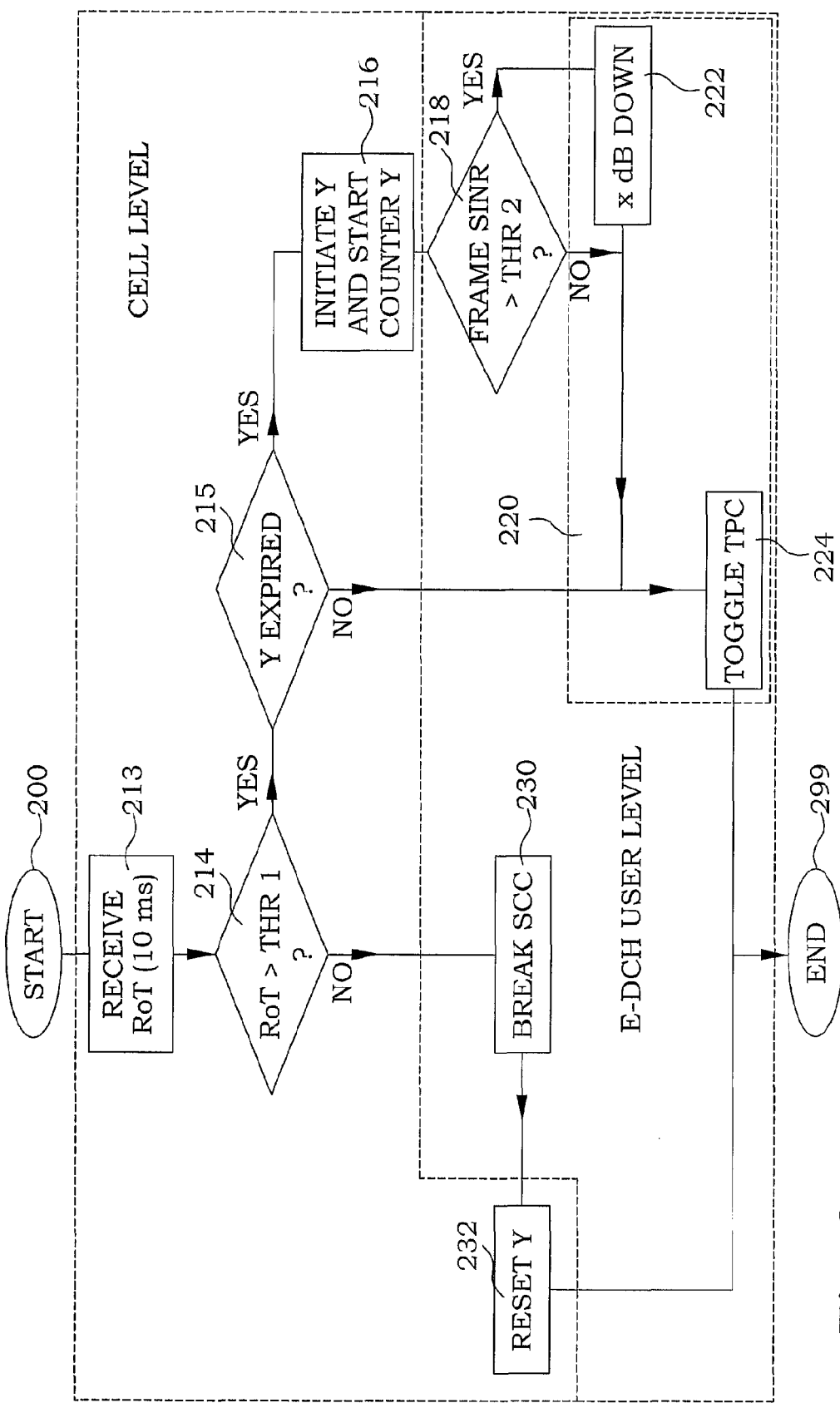
FIG. 8 is a flow diagram of steps of an embodiment of a RoT triggered SCC algorithm.

To explain the algorithm, also illustrated by the flow diagram of FIG. 8, it is triggered by the reception 240 of a new RoT measurement. It is then checked 242 if the RoT measurement is above a first threshold, in this embodiment eulMaxRot+SccRotThreshold. If this is the case, then the algorithm has detected a power rush. Note that the SCC specific parameter SccRotThreshold is given with respect to the parameter eulMaxRoT which is related to the cell coverage. This way normal behavior experienced by different users is not severely affected, since eulMaxRoT is normally larger than SccRotThreshold, and since operators tend to set eulMaxRot at very different levels. The first threshold can be different for different TTIs.

In case of a power rush, then next step 215 is check if the counter Y has expired, and to restart 216 the counter Y in case it has expired. In case no power rush is detected any ongoing SCC is stopped, step 230, and the counter Y is reset, step 232. Except for step 230, all steps so far are performed on a cell level. If a SCC process is ongoing, and a new RoT value is received, a preferred embodiment comprises stopping of the breaking of the fast inner loop power control as a response to a new RoT value below the first threshold.

Proceeding with the case of a power rush, the SCC algorithm loops over all E-DCH users with serving radio links, i.e. the procedures are performed on a E-DCH user level. For each user it is determined in step 218 if the frame SINR value of the user is above a second threshold, in this embodiment sccMinFrameSir 2 ms/10 ms. This threshold may be different for 2 ms and 10 ms users. If the frame SINR value is larger, then a preconfigured number of consecutive power down commands are issued in step 222 by the SCC algorithm, followed by toggling, step 224. Toggling is here interpreted as to command power up/down/up/down and so forth. In case the frame SINR value is below the second threshold, here sccMinFrameSir 2 ms/10 ms, only the toggling 224 is performed. The rational behind this logic is that it is desirable to reduce the UE power, but not too much since the SINR may then become so low that link performance is reduced.

The slot rate part of the preferred embodiment of the SCC algorithm essentially provides a safety net against very low SINR values and too high SINR values. These situations may arise due to fading that is faster than the 10 ms rate of the main SCC algorithm. This slot rate algorithm overrides the above radio frame rate algorithm. The slot rate algorithm is much faster than the frame rate algorithm discussed above and is thus running in parallel at the same time.

A possible pseudo code of the present embodiment is:

---

IF [Frame SINR < sccProtectedFrameSir2ms/10ms (0 dB)] AND
   [SlotSIR <= TargetSINR + SccTargetSirMargin]
      Follow TPC //TPC slow for 2 ms if TPC slow on
ELSEIF SlotSINR > TargetSINR + SccTargetSinrMargin,
   1 dB down //override TPC slow
END IF

---

Note that the above presented pseudo code only is a typical illustration of an implementation of the basic ideas. Many other detailed implementations are possible as well.

The first if-clause secures that the SINR values may not become too low, if they do that for a user, then the fast inner loop power control is released, for that user.

The "elseif" clause guards against too high values, in which case a 1 dB down (the maximum per slot) is commanded to this UE.

Figure 9:
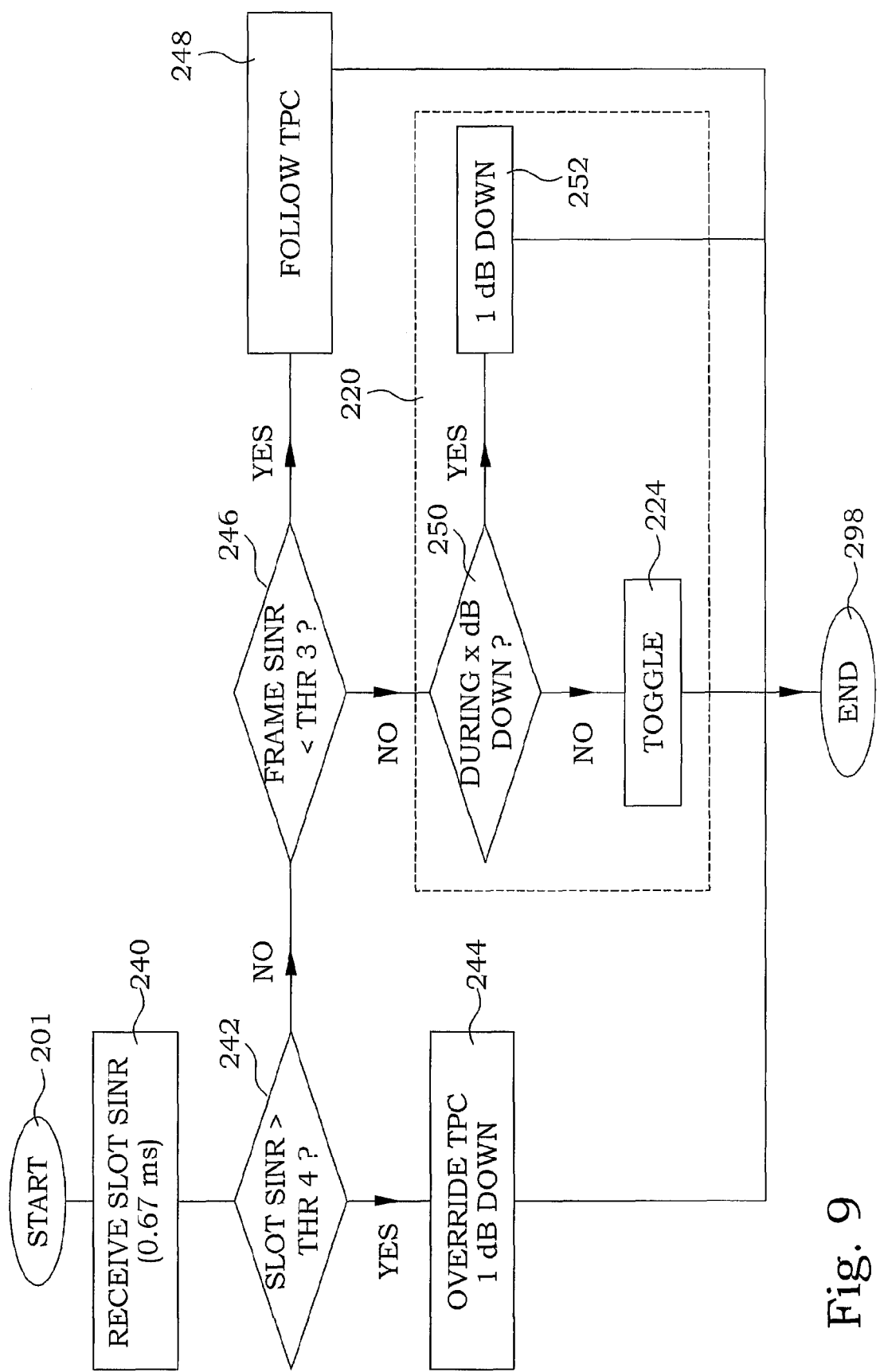
FIG. 9 is a flow diagram of steps of an embodiment of a slot SINR triggered SCC algorithm.

Further illustrations appear in FIG. 9. The process starts in step 201. Then, reception of a slot based SINR takes place in step 240. In step 242, the slot based SINR is compared to a fourth threshold, in this embodiment the Target SINR+SccTargetSinrMargin. If the SINR is too high, i.e. higher than the fourth threshold, the TPC can be overridden in step 244 and a 1 dB down command can be issued. If the slot based SINR is lower than the fourth threshold and at the same time, the frame based SINR is smaller than a third threshold, in this embodiment sccProtectedFrameSinr 2 ms/10 ms (0 dB), as checked in step 246, there is a severe risk for the UE to be dropped. The SCC algorithm is then overridden and the TPC is again applied in step 248. If the SINR is large enough this allows the SCC to be continued, the frame based SCC algorithm is allowed to continue, as shown in step 220, with references to FIG. 8. In step 250, it is controlled whether or not a power down is under operation, which then is effected in step 252, or if a toggle operation 224 is to be performed. The procedure ends in step 298.

Thus, in a preferred embodiment, the SCC comprises comparing of the frame based SINR with a third threshold for each UE in the subset. The third threshold is lower than the second threshold. A slot based SINR is determined for UEs in the subset of UEs. The slot based SINR is compared with a fourth threshold for each UE in the subset. The breaking of the fast inner loop power control adaptation is performed in dependence of the result of the comparing of the frame based SINR with a third threshold and the comparing of the slot based SINR with a fourth threshold. In a preferred embodiment, the adaptation in turn comprises recovering of the fast inner loop power control of a UE as a response to a coexistence of a frame based SINR lower than the third threshold and a slot based SINR lower than the fourth threshold. In a preferred embodiment the adaptation in turn comprises commanding of a power down step to a UE as a response to a slot based SINR higher than the fourth threshold.

In the present procedure, the steps are controlled by a number of parameters. These parameters are preferably configurable parameters and may e.g. be provided to the ULDchSr from the RxmSap (c.f. FIG. 5).

The following is a list of the system constants, i.e. a parameter in the RBS SW that affect the SCC algorithm and that are available for tuning. As can be seen some parameters are different for 2 ms and 10 ms users. The list gives a typical set of default values for the system constants, together with a range.

sccRotThreshold: default −3 dB, range same as eulMaxRoT
    sccMinFrameSir 2 ms: default 3 dB, range same as SIR target
    sccMinFrameSir 10 ms: default 3 dB, range same as SIR target
    sccProtectedFrameSir 2 ms: default 0 dB, range same as SIR target
    sccProtectedFrameSir 10 ms: default 0 dB, range same as SIR target
    sccToggleLength: default 2, range 1.10
    sccNumTpcDown: default 3, range 0.15
    sccTargetSirMargin: default 0, range 0-100 (max value to switch off)

The default values are only indicative of typical settings. Initial test indicate that it may be advantageous to increase the existing system parameter eulMaxRoT to 15-20 dB, while using a value for sccRotThreshold of −5 to −10 dB.

In other embodiments, also the sccRotThreshold and the sccTargetSinrMargin may be different for different TTIs.

To have system constants controlling the operation of the SCC makes the approach very adaptable to different situations. Therefore, in a preferred embodiment at least one of the thresholds is a configurable parameter. In a preferred embodiment at least one of said numbers is a configurable parameter. In a preferred embodiment at least one of the first, second, third and fourth thresholds is different for different length of TTIs (e.g. 2 ms or 10 ms TTI). The operator may then set the configurable parameters to suit each individual site.

In typical embodiments, different types of signals appear. In the particular embodiment of FIG. 5, it can be seen that the RoT measure is signaled from the EulSr 24 to the Ufs 34 as IDCI_UFS_ROT_FWD. One embodiment of such a signal is illustrated here below:

---

IDCI (Ufs)

---

```
#define UFS_TD_LICENCE_PRESENT 1
#define UFS_TD_LICENCE_NOT_PRESENT 0
typedef struct rotCellMeasurementS
{
    U16 rbsCellid;
    U16 rot;           /* Range: 0..800, Mapping: 0=−20dB,
                          1=−19.9dB,.. 800=60 dB (Offset 200 to avoid
                          negative values)*/
    U16 eulMaxRoot;    /* Range: 0..800, Mapping: 0=−20dB,
                          1=−19.9dB,.. 800=60 dB (Offset 200 to avoid
                          negative values)*/
    U16 pad1;
}rotCellMeasurementS;
IDCI_UFS_ROT_FWD
{
    SIGSELECT sigNo;   /* 32 bit*/
    U16 pad_sigNo;    /* Used to keep a general signal handling at
                          end-points */
    U16 ideConnid;
U16 bfn;
    U8 tdLicencePresent;
    U8 noOfCells;      /*!-
                          VARIABLE_PART(rotCellMeasurementS)-! */
    rotCellMeasurementS rotCellMeasurement[1;
}
```

---

In the particular embodiment FIG. 5, it can also be seen that the RoT measure also is signaled from the Ufs 34 to the different UlDchSr 28 as LDCI_ROT_S1. One embodiment of such a signal is illustrated here below:

---

LDCI (Ufs)

---

```
struct LDCI_ubchRot CellMeasurement
{
    //32
    wcdmatypes;;Rot rot;
    wcdmatypes;;Rot eulMaxRot;
    //8
    wcdmatypes;;RbsCellId rbsCellId;
    PAD8
    PAD8
    PAD8
};
/**@typedef TdLicencePresent
    Indicate whether the feature EUL TD can be activated or not.
*/
typedef bool TdLicence Present;
struct LDCI_dpchUIdchSrRotFwd : public LdciBase
{
    //32
    ubptypes;;ResourceIndex resourceIndex;
    //16
    //8
    ubptypes;; tdLicensePresent tdLicensePresent;
    wcdmatypes;;NumCells numCells;
    LDCI_ubchRotCellMeasurement
        rotCellMeasurement[UBP_LDCI_MAX_NUM_OF_CELLS];
};
```

---

Note that the above examples of signaling only are particular examples of signaling. The actual signaling can be arranged in many other ways as well.

Different preferred embodiments are present. In one particular preferred embodiment, the comparing of a radio frame based SINR is performed as response to a RoT value above the first threshold. In other words, if the RoT value does not give any reason for taking any actions, all measure taken for the individual users in connection with the SINR measurements can be omitted (at least for this reason). This leads e.g. to that the step 212 (FIG. 7) may be performed after step 214 (FIG. 7) if the radio frame based SINR measurements are not usable for any other purpose.

Figure 10:
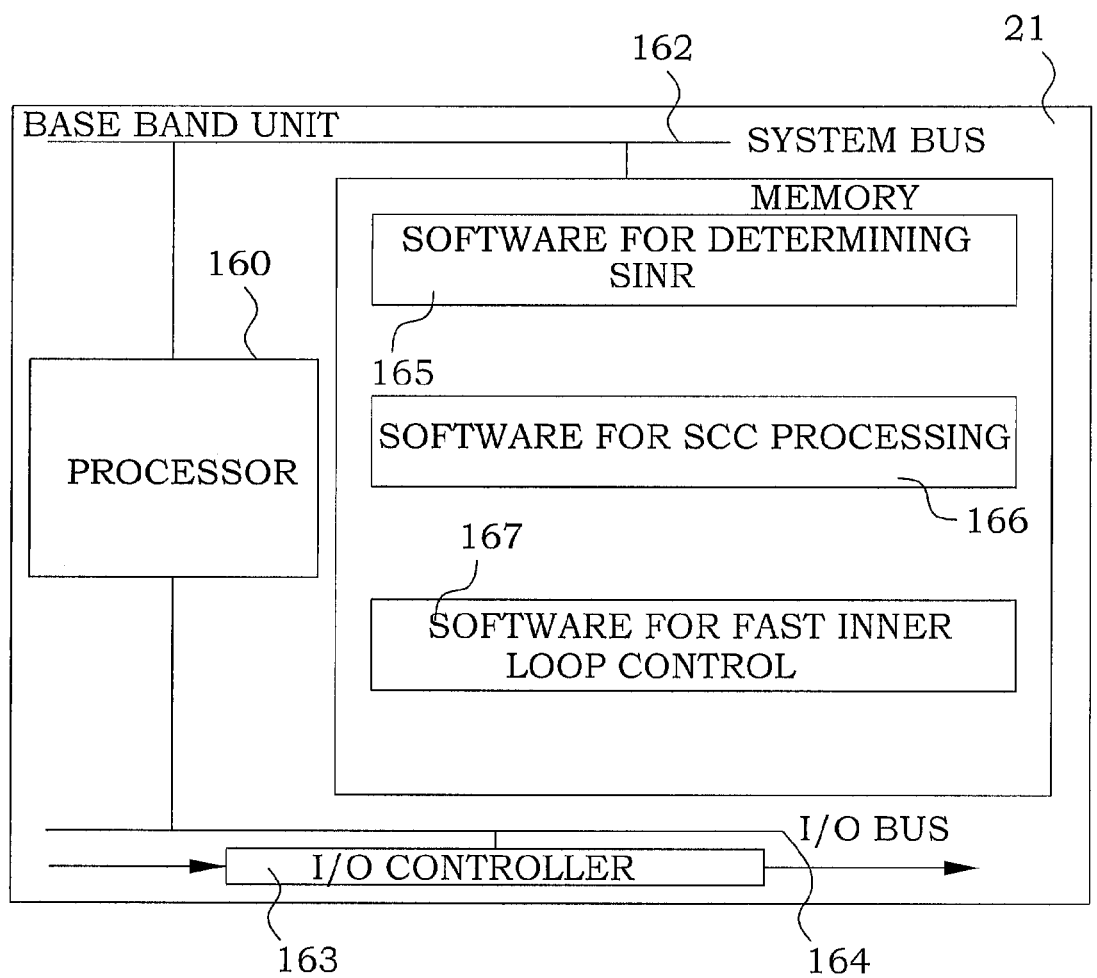
FIG. 10 is a block diagram of an embodiment of an implementation of a SCC method in a base band unit.

As an implementation example, FIG. 10 is a block diagram illustrating an example embodiment of a base band subsystem, i.e. part of a BBU 21. This embodiment is based on a processor 160, a memory 161, a system bus 162, an input/output (I/O) controller 163 and an I/O bus 164. In this embodiment the received RoT from the radio unit is received by the I/O controller 163 and is stored in the memory 161. The I/O controller 163 also controls the issue of the commands or instructions influencing the TCP. The processor 160, which may be implemented as one or a set of cooperating processors, executes software components stored in the memory 161 for performing the SCC. The processor 160 communicates with the memory 161 over the system bus 162. In particular, software component 165 may implement the functionality of block 46 in the embodiment of FIG. 6. Software component 166 may implement the functionality of block 60 in the embodiment of FIG. 6. Software component 167 may implement the functionality of block 50 in the embodiment of FIG. 6.

In a preferred embodiment of a Node B according to the present invention, the slow congestion control unit is configured to perform the comparing of a frame based SINR as response to a RoT value above the first threshold. In a preferred embodiment the slow congestion control unit is further configured for stopping the controlling of the fast inner loop power control unit as a response to a new RoT value below the first threshold. In a preferred embodiment, the interference determining unit is further configured for determining a slot based SINR for UEs in the subset of UEs. The slow congestion control unit is further configured for comparing the frame based SINR with a third threshold for each UE in the subset. The third threshold is lower than the second threshold. The slow congestion control unit is further configured for comparing the slot based SINR with a fourth threshold for each UE in the subset. The slow congestion control unit is further configured for adapting said controlling of the fast inner loop power control unit in dependence of a result of the comparing of the frame based SINR with a third threshold and a result of the comparing of the slot based SINR with a fourth threshold. In a preferred embodiment, the adaptation in turn comprises releasing of the fast inner loop power control unit concerning a UE as a response to a coexistence of a frame based SINR lower than the third threshold and a slot based SINR lower than the fourth threshold. In a preferred embodiment, the adaptation in turn comprises controlling of the fast inner loop power control unit to command a power down step to a UE as a response to a slot based SINR higher than the fourth threshold.

In a preferred embodiment, the load measure unit is comprised in a radio unit of the node B and the fast inner loop power control unit, the interference determining unit and the slow congestion control unit are comprised in a base band unit of the node B.

Recently, it has been understood that it is not always beneficial to utilize the full 1500 Hz sampling rate bandwidth of the fast inner loop power control scheme. In particular for IS receivers the use of the full bandwidth has been shown to generate oscillations and unstable behavior. It has therefore been deemed necessary to reduce the bandwidth somewhat under certain conditions.

One way to do this is by use of a novel scheme in the base station denoted slow Transmission Power Control (TPC) instead of the traditional TPC. This scheme limits the change of the commanded UE power to at most 1 dB/3 slots, instead of the normal 1 dB/slot. This is strictly speaking a slew rate reduction that has the effect of a bandwidth reduction. The advantage with the scheme is that it is very easy to implement.

The scheme operates by allowing at most 2 power up commands per 3 slots and at most 2 power down commands per 3 slots. This way the effective change is always limited to at most 1 dB up or 1 dB down, per three slots.

Note that slow TPC is useful also for TD stabilization.

Slow TPC can by advantage also be used together with the present invention.

Figure 11A:
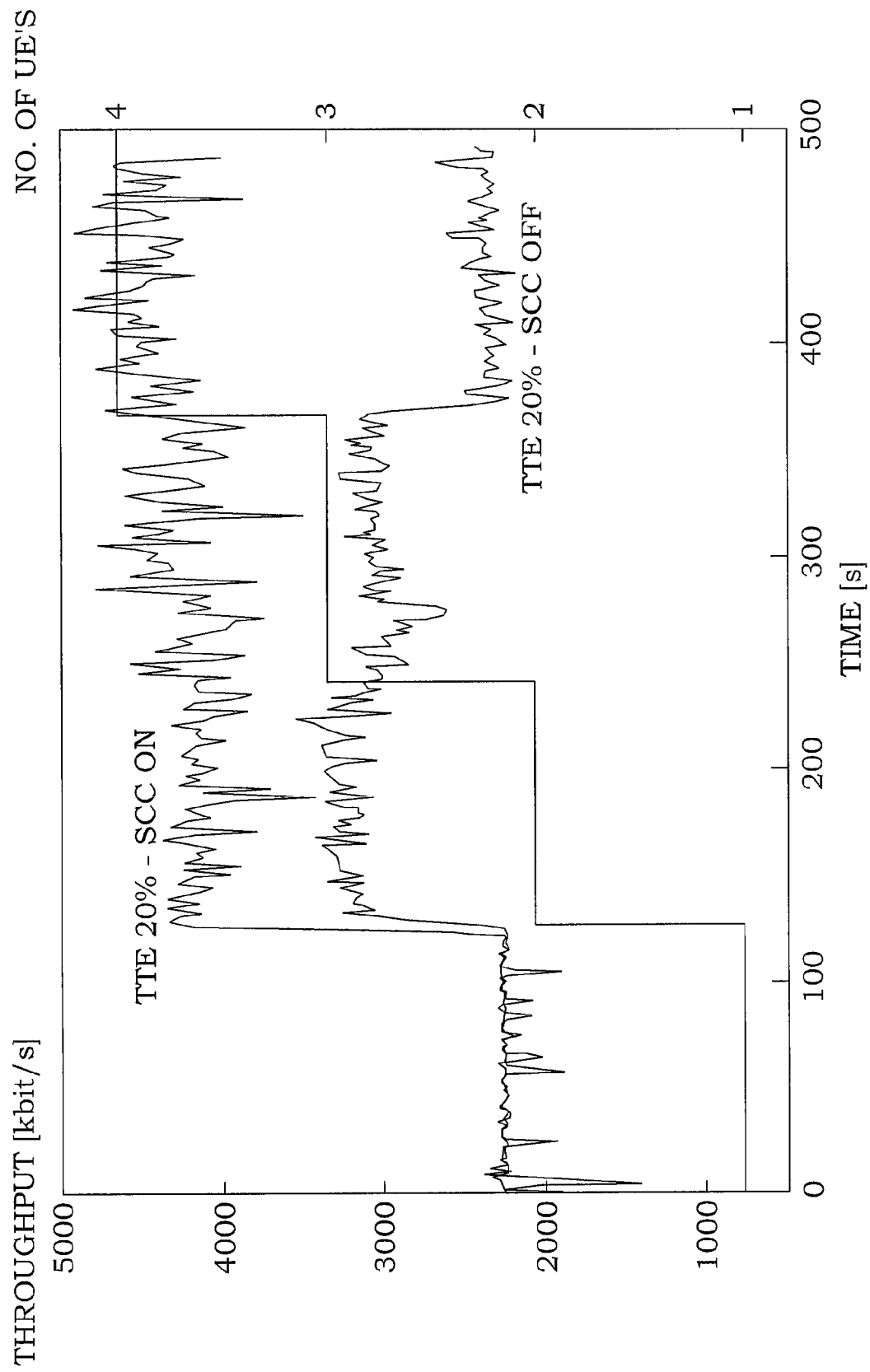
FIG. 11A is a diagram illustrating tests of cell throughput as a function of the number of UEs.
Figure 11B:
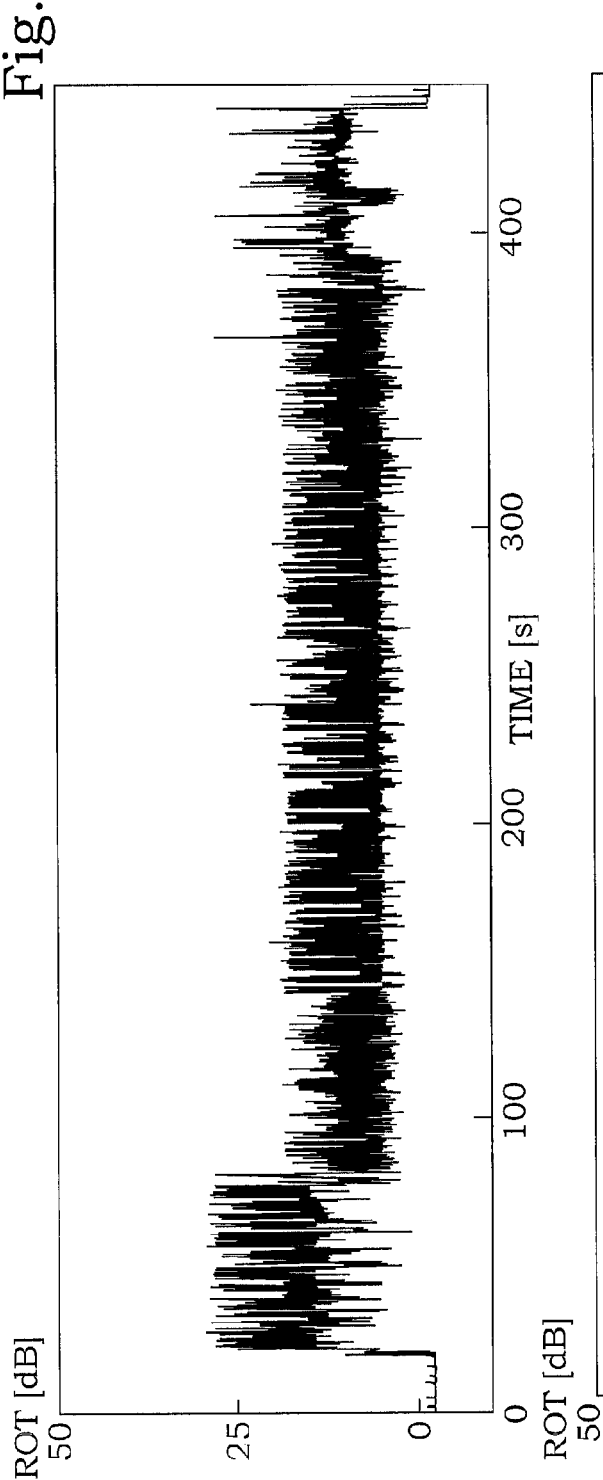
FIGS. 11B-C are diagrams illustrating RoT in a live real test network with SCC enabled and disabled, respectively.
Figure 11C:
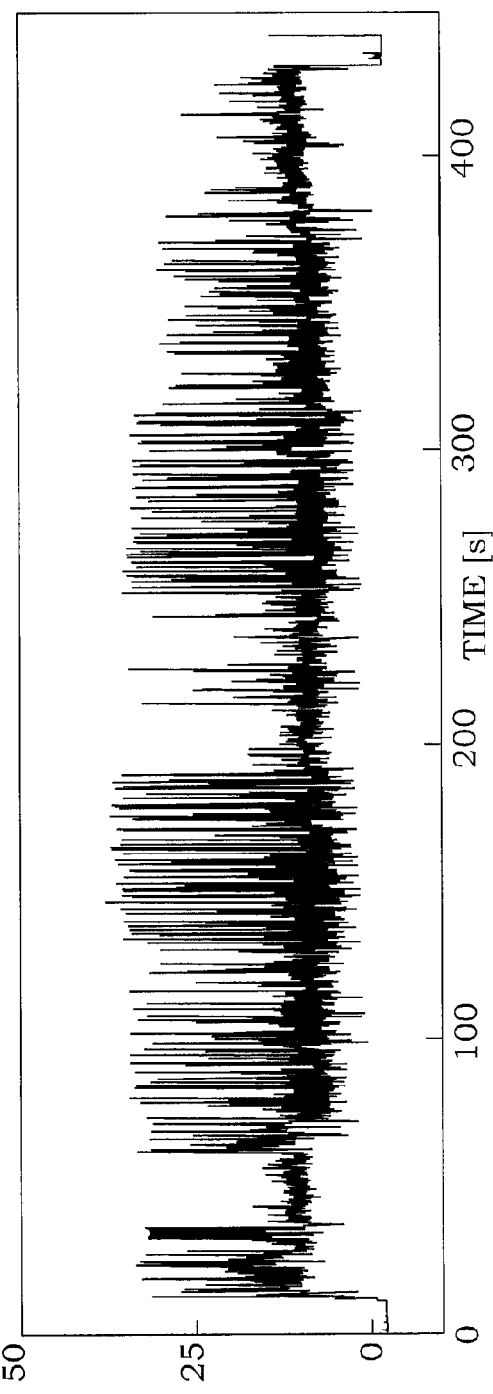

The basic advantage with the present invention is the increased stability of the power control. More aggressive scheduling as well as TD or IS procedures can then be implemented without any increased risk for power rushes or lost connections. Some test measurements are performed and preliminary results are shown in FIGS. 11A-C. The curves in FIG. 11A show the cell throughput as a function of the number of UEs. The preferred setting with SCC is shown in the top curve, whereas the current setting is shown as TTE 10%—SCC off. The gain is more than 100% for 4 UEs.

In FIG. 11B, the curve shows the RoT in a live real test network with SCC enabled. It can be seen that the RoT is almost never above 20 dB. The scheduler setting is aggressive.

In FIG. 11C, the curve shows the RoT in a live real test network with SCC disabled. It can be seen that the RoT peaks to more than 35 dB. The scheduler setting is aggressive.

As a conclusion, the SCC works as intended and give huge gains.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

REFERENCES

[1] T. Wigren and P. Hellqvist, "Estimation of uplink WCDMA load in a single RBS", Proc. IEEE VTC-2007 Fall, Baltimore, Md., USA, Oct. 1-3, 2007.
[2] T. Wigren, "Soft uplink load estimation in WCDMA", IEEE Trans Veh. Tech., March, 2009.
[3] T. L. Fulghum et al, "Adaptive Generalized Rake Reception in DS-CDMA Systems", IEEE Trans Wireless Commun. Vol. 8, No. 7, July 2009, pp. 3464-3474.
[4] T. Wigren, "Recursive noise floor estimation in WCDMA", IEEE Trans. Vehicular Tech., vol. 59, no. 5, pp. 2615-2620, 2010.

The invention claimed is:

1. A method for power control stabilization in the uplink of a cellular Code Division Multiple Access (CDMA) communication system applying a fast inner loop power control, said method comprises the steps of: determining a radio frame based rise over thermal (RoT) value for a cell in said cellular communication system; determining a radio frame based signal to interference and noise ratio (SINR) for each User Equipment (UE) in a subset of UEs being present in said cell; comparing said RoT value with a first threshold; comparing said frame based SINRs with a second threshold for each of said UEs in said subset; breaking said fast inner loop power control for a UE in dependence of a result of said step of comparing said RoT value with a first threshold and a result of said step of comparing said frame based SINRs with a second threshold; said step of breaking said fast inner loop power control in turn comprising: commanding a first number of consecutive power down commands to UEs having said frame based SINR above said second threshold as response to a RoT value above said first threshold; and toggling power control commands for said subset of UEs during a second number of radio frames as response to a RoT value above said first threshold.

2. The method according to claim 1, characterized in that said comparing of a radio frame based SINR is performed as response to a RoT value above said first threshold.

3. The method according to claim 1, characterized by the further step of stopping (230) said breaking of said fast inner loop power control as a response to a new received RoT value below said first threshold.

4. The method according to claim 1, characterized by the further steps of:
comparing said frame based SINR with a third threshold for each UE in said subset, said third threshold being lower than said second threshold;
determining a slot based SINR for UEs in said subset of UEs;
comparing said slot based SINR with a fourth threshold for each LIE in said subset; and
adapting said breaking of said fast inner loop power control in dependence of the result of said step of comparing said frame based SINR with a third threshold and said step of comparing said slot based SINR with a fourth threshold.

5. The method according to claim 4, characterized in that said step of adapting in turn comprises the step of recovering said fast inner loop power control of a UE as a response to a coexistence of a frame based SINR lower than said third threshold and a slot based SINR lower than said fourth threshold.

6. The method according to claim 4, characterized in that said step of adapting in turn comprises the step of commanding a power down step to a UE as a response to a slot based SINK higher than said fourth threshold.

7. The method according to claim 1, characterized in that at least one of said thresholds is a configurable parameter.

8. The method according to claim 1, characterized in that at least one of said numbers is a configurable parameter.

9. The method according to claim 1, characterized in that at least one of said first, second, third and fourth thresholds is different for different Transmission Time Intervals (TTIs).

10. A Node B in a Code Division Multiple Access (CDMA) cellular communication system, comprising: a fast inner loop power control unit; a load measure unit, configured for determining a radio frame based rise over thermal (RoT) value for a cell of said Node B in said cellular communication system: an interference determining unit, configured for determining a radio frame based signal to interference and noise ratio (SINR) for each User Equipment (UE) in a subset of UEs being present in said cell; a slow congestion control unit, connected to said fast inner loop power control unit, said load measure unit and said interference determining unit; said slow congestion control unit in turn comprising a first comparator, configured for comparing said RoT value with a first threshold; said slow congestion control unit in turn comprising a second comparator, comparing said frame based SINRs with a second threshold for each of the UEs in said subset; said slow congestion control unit being configured for controlling said fast inner loop power control unit in dependence of a result of said comparing of said RoT value with a first threshold and a result of said comparing of said frame based SINRs with a second threshold; said controlling of said fast inner loop power control unit comprising: controlling said fast inner loop power control unit to command a first number of consecutive power down commands to UEs having said frame based SINR above said second threshold as response to a RoT value above said first threshold; and controlling said fast inner loop power control unit to toggle power control commands for said subset of UEs during a second number of radio frames as response to a RoT value above said first threshold.

11. The node B according to claim 10, characterized in that said slow congestion control unit is configured to perform said comparing of a frame based SINR as response to a RoT value above said first threshold.

12. The node B according to claim 10, characterized in that said slow congestion control unit is further configured for stopping said controlling of said fast inner loop power control unit as a response to a new RoT value below said first threshold.

13. The node B according to claim 10, characterized in that
said interference determining unit is further configured for determining a slot based SINR for UEs in said subset of UEs;
said slow congestion control unit is further configured for comparing said frame based SINR with a third threshold for each UE in said subset, said third threshold being lower than said second threshold;
said slow congestion control unit is further configured for comparing said slot based SINR with a fourth threshold for each UE in said subset; and
said slow congestion control unit is further configured for adapting said controlling of said fast inner loop power control unit in dependence of a result of said comparing of said frame based SINR with a third threshold and a result of said comparing of said slot based SINR with a fourth threshold.

14. The node B according to claim 13, characterized in that said adapting in turn comprises releasing said fast inner loop power control unit concerning a UE as a response to a coexistence of a frame based SINR lower than said third threshold and a slot based SINR lower than said fourth threshold.

15. The node B according to claim 13, characterized in that said adapting in turn comprises controlling said fast inner loop power control unit to command a power down step to a UE as a response to a slot based SINR higher than said fourth threshold.

16. The node B according to claim 10, characterized in that at least one of said thresholds is a configurable parameter.

17. The node B according to claim 10, characterized in that at least one of said numbers is a configurable parameter.

18. The node B according to claim 10, characterized in that at least one of said first, second, third and fourth thresholds is different for different Transmission Time Intervals (TTIs).

19. The node B according to claim 10, characterized in that said load measure unit is comprised in a radio unit of said node B and said fast inner loop power control unit, said interference determining unit and said slow congestion control unit are comprised in a base band unit of said node B.

* * * * *